(12) United States Patent
Børsting et al.

(10) Patent No.: US 6,484,838 B1
(45) Date of Patent: Nov. 26, 2002

(54) STEERING ARRANGEMENT

(75) Inventors: John Børsting, Holstebro (DK); John Kristensen, Sønderborg (DK); Jesper Bloch, Nordborg (DK)

(73) Assignee: Sauer-Danfoss Holding A/S, Nordborg (DK)

( * ) Notice: Subject to any disclaimer, the term of this patent is extended or adjusted under 35 U.S.C. 154(b) by 0 days.

(21) Appl. No.: 09/674,210

(22) PCT Filed: May 6, 1999

(86) PCT No.: PCT/DK99/00253

§ 371 (c)(1),
(2), (4) Date: Oct. 27, 2000

(87) PCT Pub. No.: WO99/58390

PCT Pub. Date: Nov. 18, 1999

(30) Foreign Application Priority Data

May 8, 1998 (DE) .......................................... 198 20 774

(51) Int. Cl.$^7$ ................................................. B62D 5/00
(52) U.S. Cl. ....................................... 180/402; 180/403
(58) Field of Search ................................. 180/402, 403, 180/443, 446; 701/41, 42

(56) References Cited

U.S. PATENT DOCUMENTS

| | | | | |
|---|---|---|---|---|
| 4,077,486 A | * | 3/1978 | Blakeslee et al. | ........... 180/402 |
| 4,860,844 A | * | 8/1989 | O'Neil | ........... 180/402 |
| 5,097,917 A | * | 3/1992 | Serizawa et al. | ........... 180/402 |
| 5,251,135 A | * | 10/1993 | Serizawa et al. | ........... 180/402 |
| 5,282,135 A | * | 1/1994 | Sato et al. | ........... 180/402 |
| 5,347,458 A | * | 9/1994 | Serizawa et al. | ........... 180/402 |
| 5,893,427 A | * | 4/1999 | Bohner et al. | ........... 180/402 |
| 5,896,942 A | * | 4/1999 | Bohner et al. | ........... 180/402 |
| 5,908,457 A | * | 6/1999 | Higashira et al. | ........... 180/402 |
| 6,000,490 A | * | 12/1999 | Easton | ........... 180/402 |
| 6,059,068 A | * | 5/2000 | Kato et al. | ........... 180/402 |

* cited by examiner

*Primary Examiner*—Daniel G. DePumpo
(74) *Attorney, Agent, or Firm*—Lee, Mann, Smith, McWilliams, Sweeney & Ohlson

(57) ABSTRACT

The invention concerns a steering arrangement (1) with a steering handwheel (2), which is unrotatably connected with a steering sensor, and with a wheel (3) steered by a steering drive (4) without a mechanically active connection between steering handwheel (2) and steered wheel (3). In this steering arrangement a simple way of realizing a counter action of the steered wheel on the steering handwheel (2) is wanted. For this purpose the steering sensor is made as an electrical machine (6), which works as a generator, for the production of a steering signal and is connected with a switching device (9), whose load behavior is variable.

12 Claims, 1 Drawing Sheet

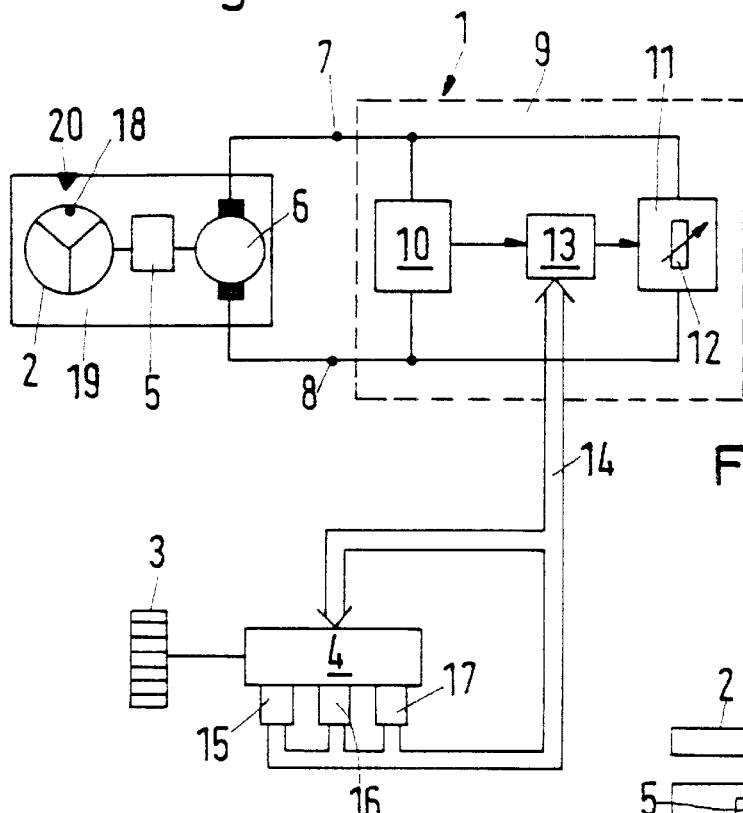
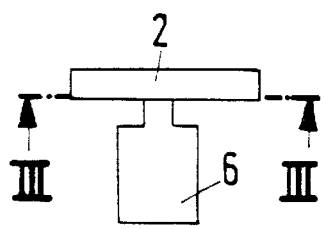
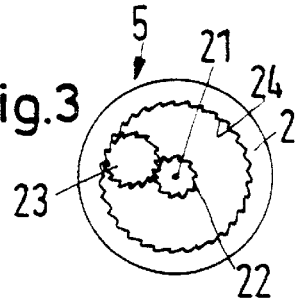
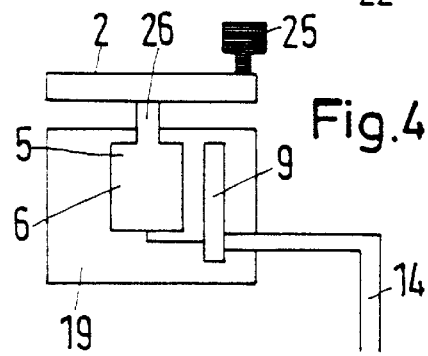
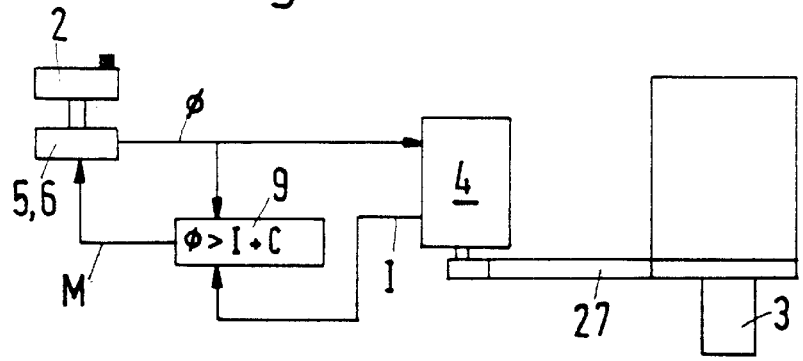

STEERING ARRANGEMENT

The invention concerns a steering arrangement with a steering handwheel, which is unrotatably connected with a steering sensor, and with a wheel steered by a steering drive without a mechanically active connection between steering handwheel and steered wheel.

An arrangement of this kind is known from DE 42 07 719 A1. The steering angle, which is transmitted from the steering handwheel via a steering shaft to the steering sensor, is used to control the opening of a hydraulic valve so that a hydraulic motor can steer wheels in one direction or the other. To give the operator a sense of the steering behavior, a counter-action motor is provided, which also acts upon the steering shaft.

The steering arrangement of the present invention is primarily used with driven machines, like, for example, fork lift trucks or forestry machines. In the course of one working day such machines perform many similar movements, for example, when a fork lift truck collects and piles up palettes. In order to optimize the movement processes for the operator ergonomically, so-called mini steering wheels have been introduced. Such a mini steering wheel is known from the Swedish patent SE 466 099. Also in connection with these mini steering wheels a counter-action is desired. However, the advantage of a compact design offered by the mini steering wheel should be maintained, even with the counter-action measures.

The task of the invention is to provide a simple method of managing a counter-action.

In a steering arrangement of the kind mentioned in the introduction, this task is solved in that the steering sensor is made as an electrical machine, working as a generator, for the production of a steering signal and is connected with a switching device, whose load behavior is variable.

This measure provides a relatively simple way of obtaining both the steering signal, that is the desired value specified by the steering handwheel, which must be followed by the steered wheel(s), and a counter-action with which the user "feels" the resistance to be overcome by the steered wheel. The steering signal is simply produced by an electrical machine working as a generator. By means of the voltage produced by the electrical machine working as a generator and the time it takes to produce the voltage both the steering speed and the steering angle can be calculated. However, the driving of a generator requires a torque, which again depends on the electric load, which must be served by the generator. An illustrative example of such a load is an ohmic resistor, which is connected with the output terminals of the generator. The smaller this resistor is, the larger is the torque required to drive the generator. A change of the electrical resistance thus enables a change of the torque to be produced by the user or operator. Of course there is a number of other opportunities of influencing the "load behavior". Instead of an ohmic resistor, commonly known electronic or electrical switching elements can be used, which change the current flow between the generator terminals. For example, a keyed switch can be used, whose keying interval can be adjusted. It is also possible to produce a counter-voltage and then feed it to the generator terminals. If, for example, the counter-voltage is larger than the generator output voltage, the user must work against a motor to turn the steering handwheel. This enables a feedback to the driver or user. With this embodiment one single mechanical element is sufficient, namely the electrical machine. An electrical machine of this kind is relatively compact, so that the advantage of a good space utilization is maintained. The combination of signal production with the opportunity of a counter-action gives a very narrow coupling between the two measures, so that major errors caused by different operational behaviors in connection with the production of steering signals and the counter action can be avoided. of course, the size and the performance of the steering handwheel and the electrical machine must be adapted to each other. A small steering handwheel only requires a small machine. The counter-torque or braking-torque can be changed in dependence of various parameters, for example, vehicle speed, vehicle load or time of day.

Preferably, a transmission is arranged between the steering handwheel and the steering sensor. This transmission causes that the electrical machine turns substantially faster than the steering handwheel. For example, a transmission ratio of 5:1 can be assumed. In this case two advantages are obtained. Firstly, a stronger steering signal is achieved, as with a higher speed the generator supplies a stronger voltage signal. Secondly, the counter-action torque of the electrical machine on the steering handwheel is accordingly amplified.

Advantageously, the steering handwheel is made as a mini steering wheel, and the transmission is integrated in the mini steering wheel. With a mini steering wheel no large torques have to be transmitted. The only requirement is that the driver must get a feeling for the steering behavior. In this case it is also sufficient to have an accordingly small or weakly dimensioned gear, which can be incorporated in the mini steering wheel. This means that only very little additional space is required for the gear.

In an alternative embodiment the transmission can be fitted on the outside of the electrical machine. As mentioned above, the transmission is a relatively small component, and the additional space required is hardly mentionable.

Advantageously, the steering handwheel is supported in a housing, in which the electrical machine and at least one part of the switching device influencing the torque are arranged, the switching device having a BUS connection. The BUS connection can, for example, be configured for a CANBUS. Exactly within the vehicle sector the CAN-BUS is very much used as BUS. By means of this CAN-BUS the required information can be transmitted from the steering handwheel to the steering drive and vice versa. It is also relatively simple to introduce additional signals, whose production devices will be described below.

Advantageously, the electrical machine can be driven as a motor. In many cases, electrical machines can be driven both as generators and as motors. When, in the present case, the electrical machine can be driven as a motor, additional opportunities occur, for example, the torque felt by the user can be increased. The motor function can also be used for other purposes.

Preferably, a torque sensor connected with the switching device is arranged on the steered wheel, and the switching device adjusts its load behavior in dependence of the output signal of the torque sensor. Thus, the forces influenced by the steered wheel can be simulated. Particularly, forces can be passed on to the steering handwheel, which act upon the steered wheel from the outside. The operator or driver then gets an even better feeling of the steering behavior of his vehicle. For example, he learns via the steering handwheel, when the steered wheel meets a resistance. By means of the torque sensor it can also be detected when the steered wheel reaches its end stop. This keeps the wear at a minimum or prevents damages.

In an advantageous embodiment the steered wheel has an end-stop sensing device connected with the switching device, and the switching device produces an irregular torque at the electrical machine, when the steered wheel reaches a movement limit. Then the operator will be informed that the steered wheel has reached its end stop, for example in that position the steering wheel vibrates or is exposed to a pulsating torque. Thus, an oversteering of the steering arrangement is prevented. The torque can be produced by a motor or be a varying resistance torque.

Preferably, the steered wheel is provided with a position sensor connected with the switching device, the. switching device returning the steered wheel to a neutral position. This may, for example, happen, when the steering handwheel does not move for a predetermined period. This gives an automatic return of the vehicle to the straight-forward position, whenever required.

In this connection it is advantageous if the switching device triggers the electrical machine synchronously with the steered wheel. Then the user simultaneously gets the information that the steered wheel is moved back to the neutral position. This enables him to interrupt this movement by an operation of the steering handwheel, for example by holding it. If he does not, the steering handwheel will also be in the neutral position at the end of the returning process. If desired, this procedure can be limited to standstill periods of the vehicle.

In a preferred embodiment it is provided that the switching device compares the steering handwheel position with the steered wheel position and adjusts the torque on the steering handwheel in dependence of the difference. Thus, for example, the steering handwheel acceleration can be influenced so that the steering handwheel cannot be turned faster than for the steered wheel to follow. When there is a large deviation between the two positions, for example, the steering handwheel is far ahead of the steered wheel. When then the torque is increased, which the operator must overcome, the steered wheel has the opportunity of catching up again.

Advantageously, the steering handwheel has a marking, and an additional stationary marking is provided in the steering handwheel surroundings, the switching device triggering the electrical machine to work as a motor, in a way that the relative position of the two markings corresponds to the angle position of the steered wheel. For example, when the steering system is used in a fork lift truck, it is important to know in which position the steered wheel is, particularly when the operator comes back and starts the vehicle again after having been away. For this purpose it is known to provide some sort of graphic representation of the wheel positions. However, advantageously, this position statement can also be realized via the steering handwheel, particularly when the steering handwheel is made as a mini steering wheel. As it is possible to act upon and adjust the angle position of the steering handwheel by means of the electrical machine working as a motor, it can be imagined that the position of the steering handwheel is adapted to the position of the steered wheel, each time the vehicle stands still and the steering handwheel is not operated for a predetermined time. For this purpose, the angle position of the steering handwheel needs not be particularly accurate, as the crucial thing is to give the operator a feeling of the position of the steered wheel.

In the following the invention is described on the basis of preferred embodiments in connection with the drawings, showing:

FIG. 1 a schematic circuit diagram for description of the steering arrangement FIG. 2 a schematic side view of a mini steering wheel FIG. 3 a view III—III according to FIG. 2

FIG. 4 an additional embodiment of a mini steering wheel

FIG. 5 a schematic view of a device in the steering arrangement

A steering arrangement 1 has a steering handwheel 2 and a steered wheel 3. A steering drive 4 is provided for the operation of the steered wheel 3. The steering drive 4 is only shown schematically. It could be a hydraulic motor with corresponding operating valves, an electrical motor with corresponding wiring or another power producing device.

The steering handwheel 2 is connected with an electrical machine 6 via a gear 5. The electrical machine can be a DC-machine, an AC-machine or a three-phase field machine. In the present case it is merely important that it can work both as a generator and as a motor. The machine shown is a DC-machine, which has the advantage that the voltage available at or produced by its terminals 7, 8 contains information about the rotation direction of the machine 6.

The electrical machine 6 is connected with a switching device 9. This switching device has two tasks. Firstly, it comprises a device 10 for detecting the voltage at the terminals 7, 8 and for evaluation of this voltage. In the "undisturbed" state, the rotation speed of the steering handwheel can be calculated by means of the terminal voltage, if required transmitted by the gear 5. The higher the speed, the higher the voltage produced by the electrical machine 6 when operated as a generator. By means of a simple integration information about the rotation angle travelled by the steering handwheel 2 can be obtained.

The gear 5 has a gear ratio higher than 1, for example 5:1. In this case one rotation of the steering handwheel 2 causes five rotations of the electrical machine 6, which involves the advantage that due to the higher rotation speed of the electrical machine 6, the voltage induced is also higher. Of course, the gear ratio must be considered when evaluating the terminal voltage.

The switching device 9 also comprises an additional device 11 by means of which the load behavior of the switching device can be changed. This is shown schematically by a variable resistor 12. The smaller the value of this ohmic resistor 12 is, the higher is the torque to be produced by the operator to turn the steering handwheel 2. Thus, the torque to be produced by the operator can be changed by the device 11. A "feedback" of the steering behavior of the steered wheel 3 on the steering handwheel 2 can be imitated or simulated by a change of the torque.

The ohmic resistor 12 was only chosen to provide a simple way of showing the variation of the torque to be produced. Of course there is a number of other ways of realizing the variations of the torque of the electrical machine 6. For example, the voltage at the terminals 7, 8 can be increased by means of the device 11, so that the operator must turn the steering handwheel 2 against an operation of the electrical machine 6 working as a motor. In this case, a reaction torque can be produced on the steering handwheel 2, which is higher than the highest counter torque, which could be produced in the electrical machine 6 when used as a generator.

For a change of the "load behavior" of the switching device through the device 11, a control device 13 is provided, which is connected with a CAN-BUS 14. The communication from the switching device 9 to the steering drive 4 takes place via the BUS 14. Further, the communication from the sensors to the switching device 9 or the control device 13 (described below), respectively, takes place via this BUS.

On the basis of the information from the device detecting the terminal voltage the control device 13 controls the steering drive. As the voltage at the terminals 7, 8 can be varied through the device 11 for a change of the load behavior of the switching device 9, the corresponding information must be considered when evaluating the terminal voltage. As, however, the setting of the "load behavior" takes place via the control device 13, the control device knows which changes it has effected, and can accordingly consider these when detecting the control signals for the steering drive 4. This is normally possible without problems, when the individual signals can be superimposed linearly, that is, in a linear superposition. Also in connection with a non-linear behavior the required information can be obtained from the terminal voltage, when the non-linearity is known.

As mentioned, various sensors are arranged on the steering drive 4. One of them is a torque sensor 15. The torque sensor detects the torque acting upon the steered wheel 3 and reports it back to the control device 13 of the switching device 9. The switching device 9 can then adapt its load behavior to the detected torque. "Load behavior" does not only mean a passive reaction. When, for example, the steered wheel meets a hindrance, it is possible that the switching device 9 increases the terminal voltage to expose the steering handwheel 2 to a corresponding motor torque against the power of the operator. This corresponds to the blow, which a steering handwheel connected mechanically with the steered wheels feeds back to the operator, when the steered wheel hits a border stone or the like.

Further, an endstop sensor 16 for both directions of the steered wheel 3 is arranged on the steering drive 4. The endstop sensor 16 detects, when the steered wheel 3 reaches its movement limit. When the switching device 9 receives this information, the voltage at the terminals 7, 8 is acted upon in a way that the electrical machine 6 operates as a motor and produces a pulsating or vibrating movement of the steering handwheel 2. For this purpose, for example, the voltage at the terminals 7, 8 is set to be periodically positive and negative. Thus, the operator gets the information that the steered wheel is at the endstop, and that a further turning of the steering handwheel 3 is pointless or even dangerous.

Finally, an additional position sensor 17 can be arranged on the steering drive 4, which provides information about the angle position of the steered wheel 3. Of course, the position sensor can also take over the function of the endstop sensor 16. The position sensor 17 is also connected with the switching device 9 via the BUS 14. Now it can be provided that the switching device 9 or the control device 13, respectively, returns the steered wheel 3 to a neutral position, when the steering handwheel 2 has not moved for a predetermined period. If required, it can be provided that this returning only occurs, when the vehicle stands still. For this purpose, a speed sensor (not shown) is provided. For the returning the electrical machine 6 can then be operated as a motor, so that the steering handwheel 2 follows the movement of the steered wheel, that is, a conformance between the angle positions of the steering handwheel 2 and the steered wheel 3 is maintained.

The steering arrangement 1 can also be used to obtain a limitation of the steering handwheel acceleration. Thus, it must not be possible to turn the steering handwheel 2 faster than for the steered wheel 3 to follow. For this purpose, it is possible, as shown in FIG. 5, to detect the steering handwheel angle ø, that is the position of the steering handwheel 2, which is passed on to the steering drive 4 as desired value. Via the steering drive 4 the actual position I of the steered wheel 3 can be detected. When now the desired value ø exceeds the actual value I by a constant value C, a corresponding counter torque M is produced by the electrical machine 6 and passed on to the steering handwheel 2. In the embodiment in FIG. 5, the steering drive 4 is connected with the steered wheel 3 via a toothed belt 27.

As shown in FIG. 1, the steering handwheel 2 has a marking 18. On the housing 19, in which the steering handwheel is supported, there is an additional marking 20. The position of the steered wheel is detected by means of the position sensor 17. When the vehicle stands still, the electrical machine 6, which is for this purpose operated as a motor, can be used to set the steering handwheel 2 so that the relative position of the two markings 18, 20 corresponds to the angle position of the steered wheel 3. This gives the operator a visual information about the angle position of the steered wheel 3, without requiring that he sees the steered wheel 3. Such information is, for example, useful, when the operator leaves the vehicle and returns after a while, or when another operator takes over the vehicle.

There are different opportunities of realizing the steering handwheel 2, which are shown in the FIGS. 2 to 4. The steering handwheel 2 shown in FIG. 2 is made as a mini steering wheel. As shown in FIG. 3, the steering handwheel 2 is rotatably arranged on a rotating shaft 21. Also a gear wheel 22 is supported on this rotating shaft 21, which gear wheel meshes with an additional gear wheel 23. The gear wheel 22 is unrotatably connected with the electrical machine 6. On its radial inside the steering handwheel 2 has a toothing 24, which co-operates with gear wheels 22, 23 in the way of a planet gear. With this embodiment, which can be extremely compact, a gear ratio of, for example, 5:1 can be obtained.

FIG. 4 shows an alternative embodiment, in which the gear 5 is fitted on the outside of the motor 6. The steering handwheel 2, which may have a mushroom shaped operating knob 25, which can also be used as marking 18, is connected with the gear 5 via a steering shaft 26. Also the complete switching device 9 is comprised in the housing 19. Only the BUS 14 is led to the outside.

What is claimed is:

1. Steering arrangement comprising a steering handwheel mechanically connected to a steering sensor, and having a wheel steered by a steering drive without a mechanically active connection between the steering handwheel and the wheel, the steering sensor comprising an electrical machine, working as a generator, producing a steering signal and being connected with a switching device providing a variable load resistance to the steering handwheel so that torque for driving the electrical machine when working as a generator is changed in dependence on the load.

2. Steering arrangement according to claim 1, in which a transmission is located between the steering handwheel and the steering sensor.

3. Steering arrangement according to claim 2, in which the transmission is integrated in the steering handwheel.

4. Steering arrangement according to claim 2, in which the transmission is located adjacent to the electrical machine.

5. Steering arrangement according to claim 1, in which the steering handwheel is supported in a housing, in which the electrical machine and at least one part of the switching device are located, the switching device having an electrical connection to the steering drive.

6. Steering arrangement according to claim 1, in which the electrical machine includes means to drive the electrical machine as a motor.

7. Steering arrangement according to claims 1, including a torque sensor connected with the switching device located proximate the steered wheel, the switching device adjusting its variable load resistance in dependence of an output signal of the torque sensor.

8. Steering arrangement according to claim 1, in which the steered wheel has an endstop sensing device connected with the switching device, and the switching device produces an irregular signal to the electrical machine when the steered wheel reaches a movement limit.

9. Steering arrangement according to claim 1, in which the steering drive includes a position sensor connected with the switching device, the switching device including means responsive to the position sensor to return the steered wheel to a neutral position.

10. Steering arrangement according to claim 9, in which the switching device includes means to activate the electrical machine synchronously with the steered wheel.

11. Steering arrangement according to claim 1, in which the switching device compares the steering handwheel position with the steered wheel position and adjusts torque on the steering handwheel in dependence on the comparison.

12. Steering arrangement according to claim 6, in which the steering handwheel has a marking, and an additional stationary marking is provided proximate the steering handwheel, the switching device including means to activate the electrical machine to work as a motor, with a relative position of the two markings corresponding to an angle position of the wheel.

* * * * *